Jan. 9, 1951  C. A. BAKER ET AL  2,537,390
APPARATUS FOR QUICK-FREEZING FOODS
Filed July 31, 1946  3 Sheets-Sheet 1
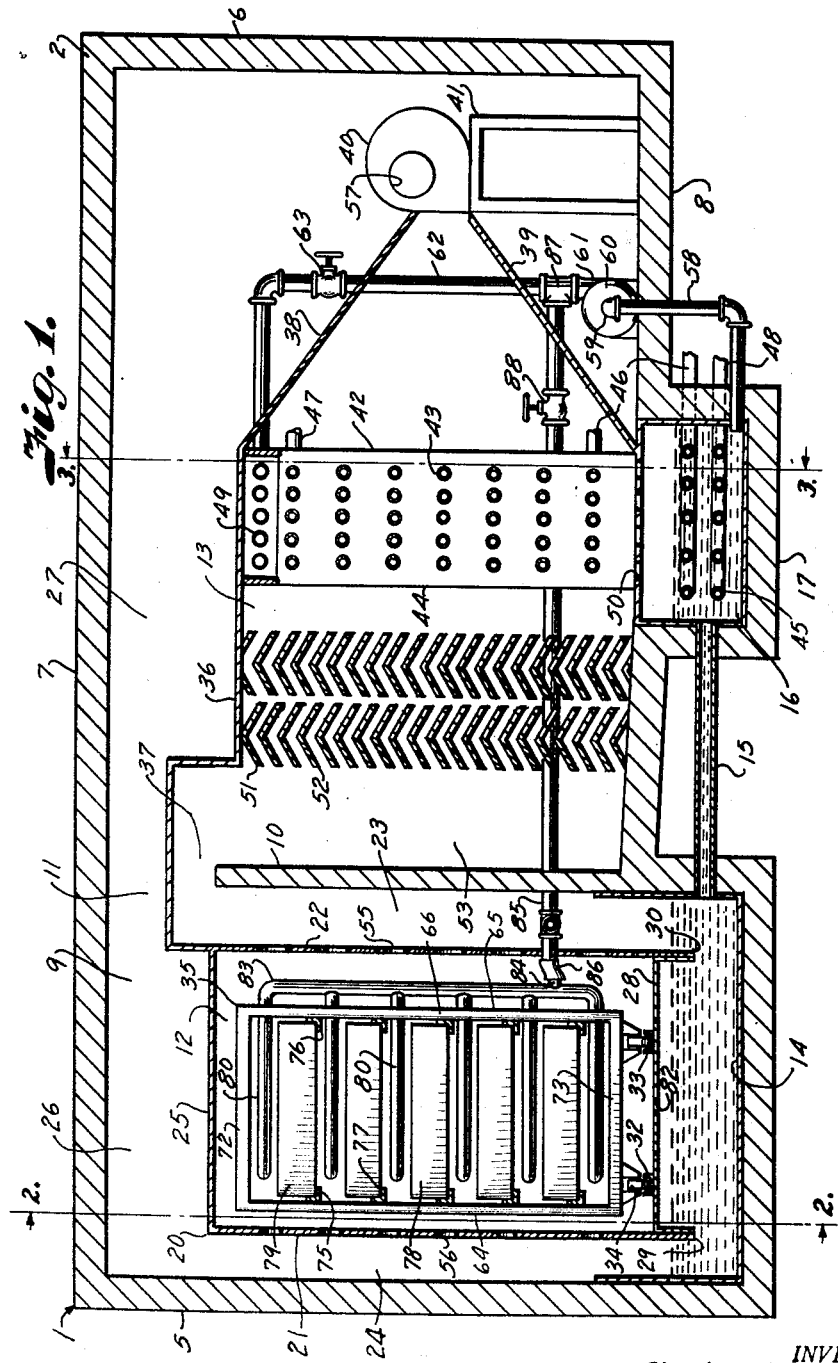
INVENTORS
Chester A. Baker, and
George Waldron Mathews.
BY
Fishburn + Mullendore
ATTORNEYS.

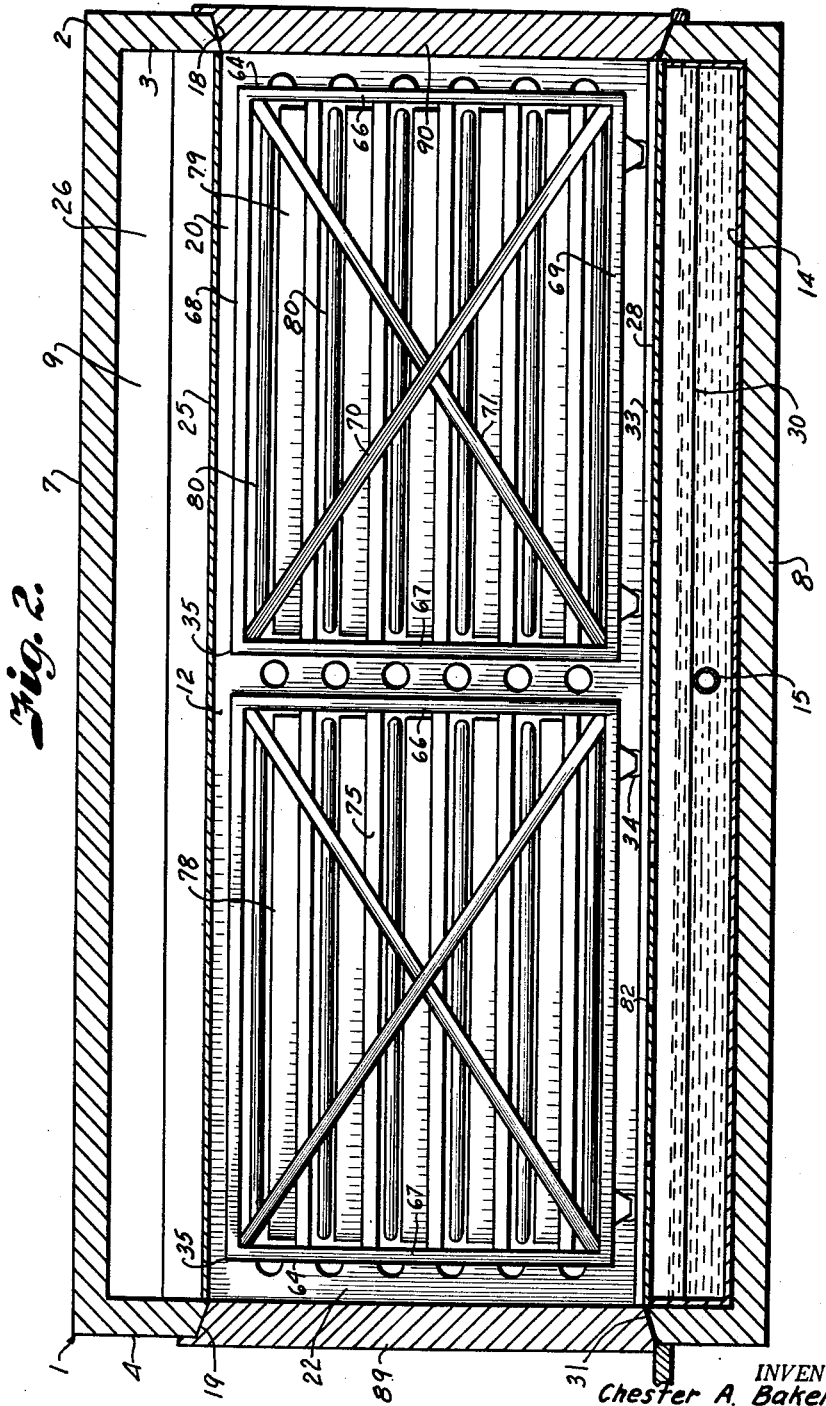

Jan. 9, 1951 C. A. BAKER ET AL 2,537,390
APPARATUS FOR QUICK-FREEZING FOODS
Filed July 31, 1946 3 Sheets-Sheet 3
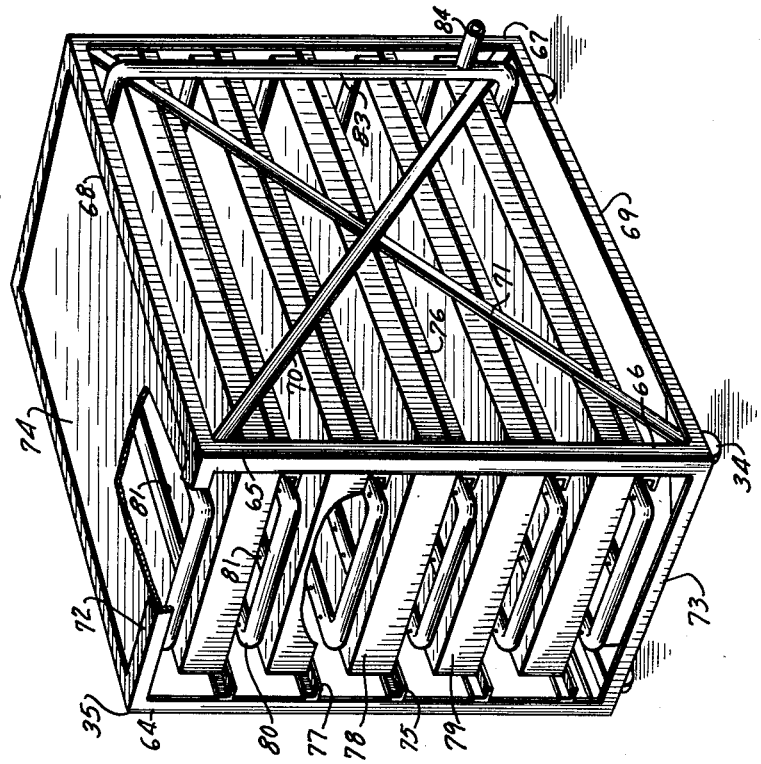
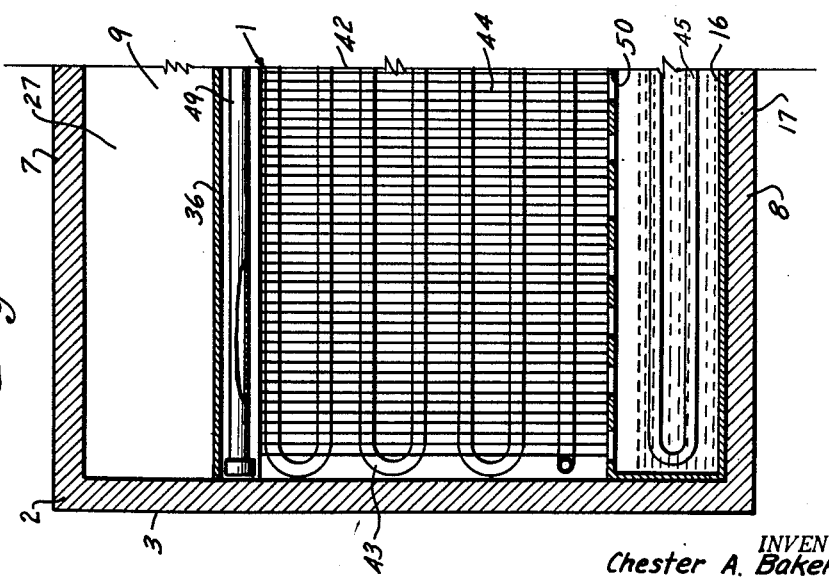
INVENTORS
Chester A. Baker, and
George Waldron Mathews.
BY
ATTORNEYS.

Patented Jan. 9, 1951

2,537,390

UNITED STATES PATENT OFFICE 2,537,390

APPARATUS FOR QUICK-FREEZING FOODS

Chester A. Baker, Glen Ridge, N. J., and George Waldron Mathews, New York, N. Y.

Application July 31, 1946, Serial No. 687,342

9 Claims. (Cl. 62—102)

This invention relates to apparatus for quick freezing the various food materials that commercial freezer plants are required to process. It is well known that in freezing certain foods, it is the best practice to subject the foods to the action of a freezing liquid while in freezing other types of foods, it is more satisfactory to submit them to refrigerated air. Consequently, modern freezer plants should be equipped with both types of freezing equipment for satisfactorily freezing all commodities. This involves larger space, much duplicate equipment, and otherwise makes the initial investment and operating costs high.

It is, therefore, the principal object of the present invention to provide a single unit in which foodstuffs and the like may be frozen by either method or partly processed by one method and finished by the other.

Other objects of the invention are to provide a small, compact freezer unit having a large capacity in that it is adapted for substantially continuous operation; to provide a freezer unit wherein a liquid freezing medium is utilized for refrigerating the air when air is used as a freezing medium; to provide for sealing of the bottom of the freezer chamber of the unit by means of freezing liquid; to provide the unit with a freezing chamber adapted to contain wheel supported trucks bearing the commodity to be frozen; to provide such trucks with self-contained sprays that are adapted to be readily connected with and disconnected from the freezing liquid circulating system of the unit; to provide for substantially uniform distribution of freezing air in contact with the commodities carried in the trucks; and to provide means for assuring separation of the freezing liquid from the freezing air before admission of the air into the freezing compartment.

In accomplishing these and other objects of the invention, we have provided improved structure, the preferred form of which is illustrated in the accompanying drawings wherein:

Fig. 1 is a vertical section through a quick freezer unit embodying the features of the present invention and which is especially adapted to both freezing practices.

Fig. 2 is a vertical cross section through the unit on the line 2—2 of Fig. 1, particularly illustrating the freezer compartment and the commodity carrying trucks contained therein.

Fig. 3 is a section through one side of the air chilling equipment on the line 3—3 of Fig. 1.

Fig. 4 is a perspective view of one of the trucks on which the commodity to be frozen is carried into the freezer compartment and in which the commodity is frozen.

Referring more in detail to the drawings:

I designates a quick freezing unit embodying the features of the present invention and which is equipped to utilize a liquid or air at freezing temperatures for the freezing food commodities. In the illustrated instance the unit comprises an outer housing 2 having side walls 3—4, end walls 5—6, a top 7 and a bottom 8, all formed of any suitable material and well insulated to retain the desired low temperatures within the space 9 enclosed thereby.

Extending transversely of the housing from one side wall to the other and spaced nearer the end wall 5 is a vertical partition 10 which terminates short of the top 7 to provide a space 11 thereover that connects a freezer space 12 with an air and liquid chilling space 13 on the respective sides of the partition.

The bottom of the freezer space 12 is set below the bottom of the space 13 to accommodate a basin 14 adapted to catch and store the freezing liquid which may be any suitable brine used in the liquid freezing process as later described. The brine collected in the catch basin 14 flows through a pipe 15 into a brine chilling tank 16 that is contained within an offset portion 17 of the bottom of the space 13. Formed in opposite side walls of the housing in registry with the freezer space 12 are door openings 18 and 19, conforming in size and shape to a passageway or freezer chamber 20 contained within the freezer space and formed by side walls 21 and 22 that are respectively spaced from the end wall 5 and partition 10 to provide air passage ways 23 and 24 at outer sides thereof. The top of the freezer chamber and the air passageway 23 are closed by a top 25 that is spaced below the top 7 to provide a horizontal air passageway 26 connected at one end with the upper end of the air passageway 24 and at the other end with an air passageway 27 immediately below the top 7. The bottom of the freezing chamber 20 is closed by a floor 28 inset upwardly from the lower edges 29 and 30 of the sides 21 and 22 but preferably registering with the sills 31 of the door openings 18 and 19 to accommodate rails 32 and 33 that guide wheels 34 of rack-like trucks 35 later described. The lower edges 29 and 30 of the side walls project into the liquid of the catch basin to provide a liquid seal closing the lower ends of the air passageways 23 and 24 as best shown in Fig. 1.

Extending transversely of the space 13 is a horizontal partition 36 forming the bottom of the passageway 27 and the top of a passageway 37 over the top of the partition 10. The partition 36 terminates over the brine tank 16 and connects with a downwardly sloping partition 38 which cooperates with an upwardly sloping partition 39 to form a funnel-like discharge from a blower 40. The blower 40 is mounted on a suitable framework 41 as shown in Fig. 1. The lower partition 39 connects with the top of the brine tank directly below the end of the partition portion 36.

Carried above the brine tank and extending up to the partition 39 is an air chiller 42 comprising a bank of transversely extending refrigerating coils 43 carrying heat absorbing fins 44 located so that the air discharged from the blower is caused to move along the surface thereof. The coils 43 are connected with a refrigerating coil 45 in the brine tank through a pipe connection 46. The opposite end of the coils are connected by supply and return ducts 47 and 48 with a source of refrigeration supply (not shown), but which may be of a standard type having sufficient capacity to supply the required amount of refrigeration medium.

Carried above the upper bank of coils 43 are sprays 49 in the form of pipes extending longitudinally of the vertical tiers of pipes in the coil bank and having discharge orifices for spraying brine downwardly onto the coils 43 and across the path of the air stream. After passing the coils 43, the brine drains into the tank 16 through suitable openings 50 in the top thereof as best shown in Figs. 1 and 3.

In order to eliminate spray from being carried along with the air stream, we provide a spray eliminator 51 which may consist of one or more series of baffles 52 for changing the air flow sufficiently to knock out any entrained liquid without materially reducing the air velocity. The spray eliminator is positioned so that it is spaced from the partition 10 to provide an upflow passageway 53 that connects with the passageway 23 at the top of the partition 10 through the horizontal passageway 37. The side wall 22 is provided with a plurality of apertures 55 spaced over the area of the wall to distribute flow of air transversely of the freezer chamber for discharge through similar perforations 56 in the wall 21. The total area of the perforations 56 in the wall 21 are preferably less than the area of the perforations 55 in the wall 22 so as to create a build up of pressure within the freezer chamber and thereby insure uniform air flow throughout the entire freezing space, the air discharged through the perforations 56, being drawn from the passageway 24 and through the passageways 26 and 27 to the inlet opening 57 of the blower for recirculation through the refrigerating coil bank, and spray eliminator for return to the freezing chamber. Spray fluid for the spray pipes is drawn from the brine tank through a pipe 58 having connection with the inlet 59 of a pump 60. The outlet 61 of the pump 60 is connected by a pipe 62 with the spray heads, flow being controlled by a valve 63 connected into the pipe 62.

The trucks 35 previously mentioned are best illustrated in Fig. 4 and include side frames 64 and 65, each comprising vertical corner members 66 and 67 connected at the upper and lower ends by horizontal rails 68 and 69 and by diagonal braces 70 and 71. The side frames are connected in spaced relation at their upper and lower ends by cross rails 72 and 73 and at the top by a cover plate 74. Extending longitudinally of the side frames in vertically spaced parallel relation are pairs of guide rails 75 and 76 having inwardly extending flanges 77 cooperating to support freezing pans or trays 78 that are adapted to contain the food or other commodity to be frozen. The trays 78 may be of any suitable design but are preferably provided with covers 79 to prevent entrance of freezing liquid into the pans. Carried by the frame intermediate the trays and above the upper tray are spray pipes 80 having apertures 81 in the upper side for discharging sprays of brine onto the pans which gravitates to the next lower pan and flows across the cover thereof for gravitation to the catch basin 14. The floor 28 of the freezing chamber extends over the top of the catch basin and is provided with suitable openings 82 to pass the returning liquid. The spray pipes are connected by common headers 83 carried by the frames of the respective trucks and which have nipples 84 that are adapted to be connected with a supply pipe 85 when the trucks are in position within the freezing chamber, the connections being made by a suitable connector 86. The pipe 85 connects with the T fitting 87 in the pipe 62 and is provided with a shut off valve 88 whereby flow to the freezing chamber may be cut off when air is used for the freezing medium and when the connections are being made with the respective trucks. The door openings of the freezing chamber are closed by doors 89 and 90 similar to ordinary refrigerator doors and suitably insulated so as to make tight closures.

In using the unit constructed and assembled as described for freezing commodities by chilled air, the commodities are placed in the trays on pans, after which the filled trays are placed in the trucks while the trucks are outside of the freezing space. When the trucks are filled with trays the door on the entrance side of the freezing chamber is opened and the filled trucks are pushed therethrough into the freezing chamber with the wheels being guided by the rails 32 and 33. When the trucks are in position, the door on the entrance side of the freezing chamber is closed. With the refrigerating machinery in operation, chilled brine in the tank 16 is removed by the pump 60 through the pipe 58 and discharged under pressure through the pipe 62 for spray discharge through the spray pipes 49 onto the bank of coils 43 where the spray is additionally cooled to bring the air discharged by the blower 40 to the desired low temperature. The air may pick up some of the spray, but this is eliminated by the spray eliminators 51 before the air reaches the passage way 52. The chilled air under pressure of the blower moves upwardly through the passageway 53 and downwardly into the passageway 23 wherefrom it is distributed through the perforations 55 into the freezing chamber. Since the perforations 55 on the discharge side are of less area, a pressure will build up within the freezing chamber to assure uniform distribution in all parts thereof so as to maintain the desired freezing temperature in contact with the trays. The air warmed through contact with the trays is discharged through the perforations 56 into the passageway 24 from which it is drawn by suction of the blower for recirculation.

In case the commodities to be frozen are best treated with a freezing liquid, the air flow is suspended and the connections 86 are made between the spray manifolds of the respective trucks. Upon opening of the valve 88, a portion of the circulated brine is discharged under pump pressure through the spray heads to discharge upwardly against the bottoms of the trays for flow onto the next lower tray and discharge over the sides thereof into the catch basin.

The spray coil supported above the top of the uppermost tray discharges against the closed tops of the trucks and is deflected onto the top of the upper tray. The spray draining into the catch basin is returned to the brine refrigerating tank through the pipe 15 for recirculation.

When the unit has been in operation a sufficient time to freeze the commodities, the door on the outlet end of the freezing chamber is opened and the trucks are pushed therefrom. In the meantime, other trucks have been loaded with commodities to be frozen and they are immediately pushed into the freezing chamber. It is thus obvious that the apparatus provides for a substantially continuous processing of foods.

To start the freezing operation with the freezing liquid and finish the freezing operation with air, the unit is first placed in operation to utilize the freezing liquid in the freezing chamber, after which the sprays are suspended and the air flow started to complete the desired results.

While we have shown in the foregoing specification and description a freezing unit of two truck capacity it is obvious that for small plants having limited requirements, a unit employing a single truck is equally efficient and practical. Conversely, in any plant where the freezing requirements run into many tons per hour, the outer housing can be extended to form a multi-compartment unit, each compartment being responsive to individual or simultaneous operation using either the freezing medium of liquid or air.

From the foregoing it is obvious that we have provided a simple freezer unit that is adapted for freezing commodities by liquid and/or air freezing medium and that the unit is of simple construction and occupies a substantially smaller space than individual liquid and air freezing units. It is also obvious that duplication of equipment is eliminated since the freezing liquid is utilized to help bring the temperature of the air to the desired freezing temperatures when the air method of freezing is desired.

What we claim and desire to secure by Letters Patent is:

1. In an apparatus of the character described, a housing having a freezing chamber for articles to be frozen, means for delivering a liquid freezing medium to said chamber, means for delivering a freezing air to said chamber, means in the housing for maintaining freezing temperature of the liquid freezing medium, and means for discharging the liquid freezing medium through the freezing air to maintain freezing temperature of said air.

2. An apparatus of the character described including a housing, laterally spaced perforated walls extending transversely across the housing to divide the housing into a freezing chamber intermediate said walls and a vertical inlet passageway at one side of the freezing chamber and a vertical outlet passageway at the opposite side of the freezing chamber, means forming a catch basin in the housing below said freezing chamber for containing a body of freezing liquid formed by drainage of freezing liquid from the freezing chamber, said walls having lower edges extending into the body of freezing liquid for sealing lower ends of said vertical passageways, a blower in said housing having a discharge connection with the inlet passageway for discharging freezing air under pressure through the perforations at that side of the freezing chamber and having an inlet connection with the outlet passageway for withdrawing said air from the freezing chamber through the perforations in the wall at that side of the freezing chamber to maintain said freezing air in circulation, means for withdrawing freezing liquid from said catch basin and discharging the withdrawn freezing liquid through said air, means for cooling the freezing liquid, and means for returning the cooled freezing liquid to the catch basin to maintain said seals.

3. An apparatus of the character described including a housing, laterally spaced perforated walls extending transversely across the housing to divide the housing into a freezing chamber intermediate said walls and a vertical inlet passageway at one side of the freezing chamber and a vertical outlet passageway at the opposite side of the freezing chamber, means forming a catch basin in the housing below said freezing chamber for containing a body of freezing liquid formed by drainage of freezing liquid from the freezing chamber, said walls having their lower edges extending into the body of freezing liquid for sealing lower ends of said vertical passageways, a blower in said housing having a discharge connection with the inlet passageway for discharging freezing air under pressure through the perforations at that side of the freezing chamber and having an inlet connection with the outlet passageway for withdrawing said air from the freezing chamber through the perforations in the wall at that side of the freezing chamber to maintain said freezing air in circulation, means located in said housing in the path of discharge from the blower for refrigerating said air, means for withdrawing freezing liquid from said catch basin and discharging the withdrawn freezing liquid through the air refrigerated by said refrigerating means, means for cooling the freezing liquid, and means for returning the cooled freezing liquid to the catch basin to maintain said seals.

4. An apparatus of the character described including a housing, laterally spaced perforated walls extending transversely across the housing to divide the housing into a freezing chamber intermediate said walls and a vertical inlet passageway at one side of the freezing chamber and a vertical outlet passageway at the opposite side of the freezing chamber, means forming a catch basin in the housing below said freezing chamber for containing a body of freezing liquid formed by drainage of freezing liquid from the freezing chamber, said walls having their lower edges extending into the body of freezing liquid for sealing lower ends of said vertical passageways, spray means in the freezing chamber for discharging the freezing liquid, a blower in said housing having a discharge connection with the inlet passageway for discharging freezing air under pressure through the perforations at that side of the freezing chamber and having an inlet connection with the outlet passageway for withdrawing said air from the freezing chamber through the perforations in the wall at that side of the freezing chamber to maintain said freezing air in circulation, refrigerating means located in said housing for refrigerating said air, means including a pump for withdrawing the freezing liquid from said catch basin and discharging freezing liquid over the refrigerating means and through said air, duct means connecting the spray means with the pump, and means for returning the freezing liquid to the catch basin to maintain said seals.

5. An apparatus of the character described including a housing, laterally spaced perforated walls extending transversely across the housing to divide the housing into a freezing chamber intermediate said walls and a vertical inlet passageway at one side of the freezing chamber and a vertical outlet passageway at the opposite side of the freezing chamber, means forming a catch basin in the housing below said freezing chamber for containing a body of freezing liquid formed by drainage of freezing liquid from the freezing chamber, said walls having lower edges extending into the body of freezing liquid for sealing lower ends of said vertical passageways, a blower in said housing having a discharge connection with the inlet passageway for discharging freezing air under pressure through the perforations at that side of the freezing chamber and having an inlet connection with the outlet passageway for withdrawing said air from the freezing chamber through the perforations in the wall at that side of the freezing chamber to maintain said freezing air in circulation, means located in said housing in the path of discharge from the blower for refrigerating said air, means for withdrawing freezing liquid from said catch basin and discharging the withdrawn freezing liquid through the air refrigerated by said refrigerating means, means between the refrigerating means and said inlet passageway for removing entrained freezing liquid from said air, the aggregate area of said perforations in the wall at the discharge side of said freezing chamber being less than the aggregate area of the perforations in the wall at the inlet side of the freezing chamber for enabling the blower to maintain a pressure differential in the freezing chamber, and means for returning the freezing liquid to the catch basin to maintain said seals.

6. An apparatus of the character described including a housing, a partition wall extending transversely within the housing, laterally spaced perforated walls extending transversely within the housing at one side of the partition wall to form a freezing chamber intermediate said perforate walls and inlet and outlet passageways at the sides of the freezing chamber, said upper and lower ends of the walls being spaced from top and bottom of the housing, a top for the freezing chamber connecting the upper ends of said perforate walls to cooperate with the top of the housing in forming a horizontal passageway connected with the outlet passageway, means forming a freezing liquid collecting basin in the bottom of the housing below the freezing chamber for collecting a body of freezing liquid draining from the freezing chamber to maintain a seal with lower ends of said perforate walls to close the lower ends of the vertical passageways, a blower in the housing at the opposite side of the partition wall and having discharge connection with the inlet passageway for discharging a freezing air through the perforations at that side of the freezing chamber and having an inlet connection with the horizontal passageway for withdrawing freezing air through the perforations at the outlet side of the freezing chamber to maintain circulation of the freezing air, a refrigerating means located in the path of the circulated air to maintain freezing temperature, means for supplying the freezing liquid to the freezing chamber, means for withdrawing the freezing liquid from the catch basin and discharging the freezing liquid through said circulated air, and means for returning the freezing liquid to the catch basin after contact with the refrigerating means.

7. An apparatus of the character described including a housing, a partition wall extending transversely within the housing, laterally spaced perforated walls extending transversely within the housing at one side of the partition wall to form a freezing chamber intermediate said perforate walls and inlet and outlet passageways at the sides of the freezing chamber, said upper and lower ends of the walls being spaced from top and bottom of the housing, a top for the freezing chamber connecting the upper ends of said perforate walls to cooperate with the top of the housing in forming a horizontal passageway connected with the outlet passageway, means forming a freezing liquid collecting basin in the bottom of the housing below the freezing chamber for collecting a body of freezing liquid draining from the freezing chamber to maintain a seal with lower ends of said perforate walls to close the lower ends of the vertical passageways, a blower in the housing at the opposite side of the partition wall and having discharge connection with the inlet passageway for discharging a freezing air through the perforations at that side of the freezing chamber and having an inlet connection with the horizontal passageway for withdrawing freezing air through the perforations at the outlet side of the freezing chamber to maintain circulation of the freezing air, a refrigerating means located in the path of the circulated air to maintain freezing temperature, means for supplying the freezing liquid to the freezing chamber, a chilling tank in the bottom of the housing, a duct connecting the chilling tank with the collecting basin for flow of freezing liquid from the collecting basin into said tank, means for withdrawing freezing liquid from the tank and discharging the freezing liquid over the refrigerating means, and means for returning the freezing liquid after contact with the refrigerating means to the chilling tank.

8. An apparatus of the character described including a housing, laterally spaced perforated walls extending transversely across the housing to divide the housing into a freezing chamber intermediate said walls and a vertical inlet passageway at one side of the freezing chamber and a vertical outlet passageway at the opposite side of the chamber, means forming a catch basin in the housing below the freezing chamber, a blower in said housing having a discharge connection with the inlet passageway for discharging freezing air under pressure through the perforations at one side of the freezing chamber and having inlet connection with the outlet passageway for withdrawing air from the freezing chamber through the perforations in the wall at that side of the freezing chamber to maintain said freezing air in circulation, refrigerating means between the outlet of said fan and the inlet passageway for maintaining said air at freezing temperature relative to the freezing temperature of a commodity to be frozen in the freezing chamber, means forming a collecting basin at the bottom of the housing below the refrigerating means and having connection with the collecting basin at the bottom of the freezing chamber, means for withdrawing the freezing liquid and discharging the freezing liquid over the refrigerating means for return to the collecting basin, and means for delivering a part of said freezing liquid into the freezing chamber.

9. An apparatus of the character described including a housing, laterally spaced perforated walls extending transversely across the housing to divide the housing into a freezing chamber intermediate said walls and a vertical inlet passageway at one side of the freezing chamber and a vertical outlet passageway at the opposite side of the chamber, means forming a catch basin in the housing below the freezing chamber, a blower in said housing having a discharge connection with the inlet passageway for discharging freezing air under pressure through the perforations at one side of the freezing chamber and having inlet connection with the outlet passageway for withdrawing air from the freezing chamber through the perforations in the wall at that side of the freezing chamber to maintain said freezing air in circulation, refrigerating means between the outlet of said fan and the inlet passageway for maintaining said air at freezing temperature relative to the freezing temperature of a commodity to be frozen in the freezing chamber, means forming a collecting basin at the bottom of the housing below the refrigerating means and having connection with the collecting basin at the bottom of the freezing chamber, means for withdrawing the freezing liquid and discharging the freezing liquid over the refrigerating means for return to the collecting basin, refrigerating means in one of said basins, and means for delivering a part of said freezing liquid into the freezing chamber.

CHESTER A. BAKER.
GEORGE WALDRON MATHEWS.

REFERENCES CITED

The following references are of record in the file of this patent:

UNITED STATES PATENTS

| Number | Name | Date |
|---|---|---|
| 2,068,435 | Rutishavser | Jan. 19, 1937 |
| 2,131,131 | Zarotschenzeff | Sept. 27, 1938 |
| 2,135,181 | Jones | Nov. 1, 1938 |
| 2,145,323 | Stafford | Jan. 31, 1939 |
| 2,162,213 | Conn | June 13, 1939 |
| 2,389,267 | Matthei | Nov. 20, 1945 |